Patented June 10, 1941

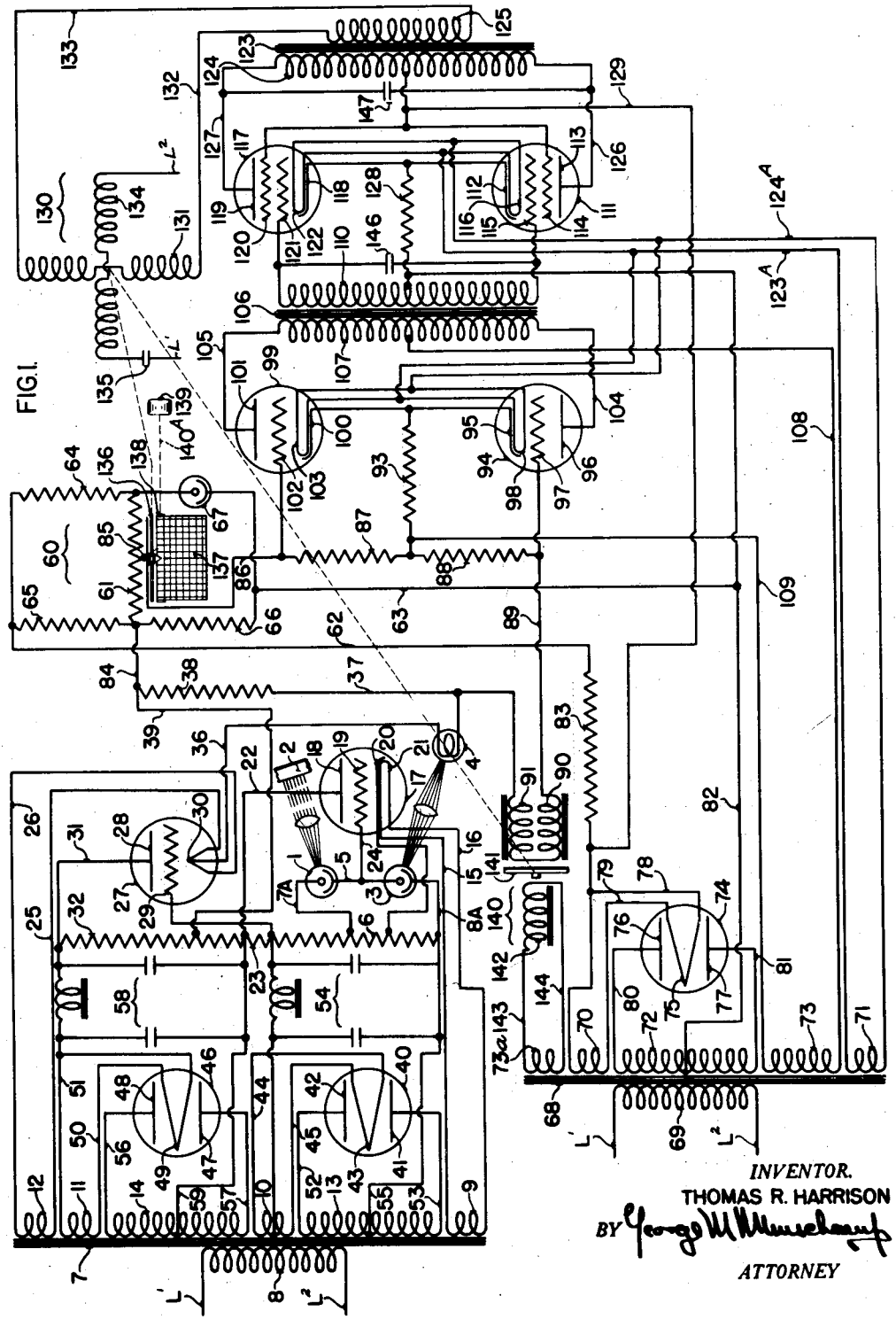

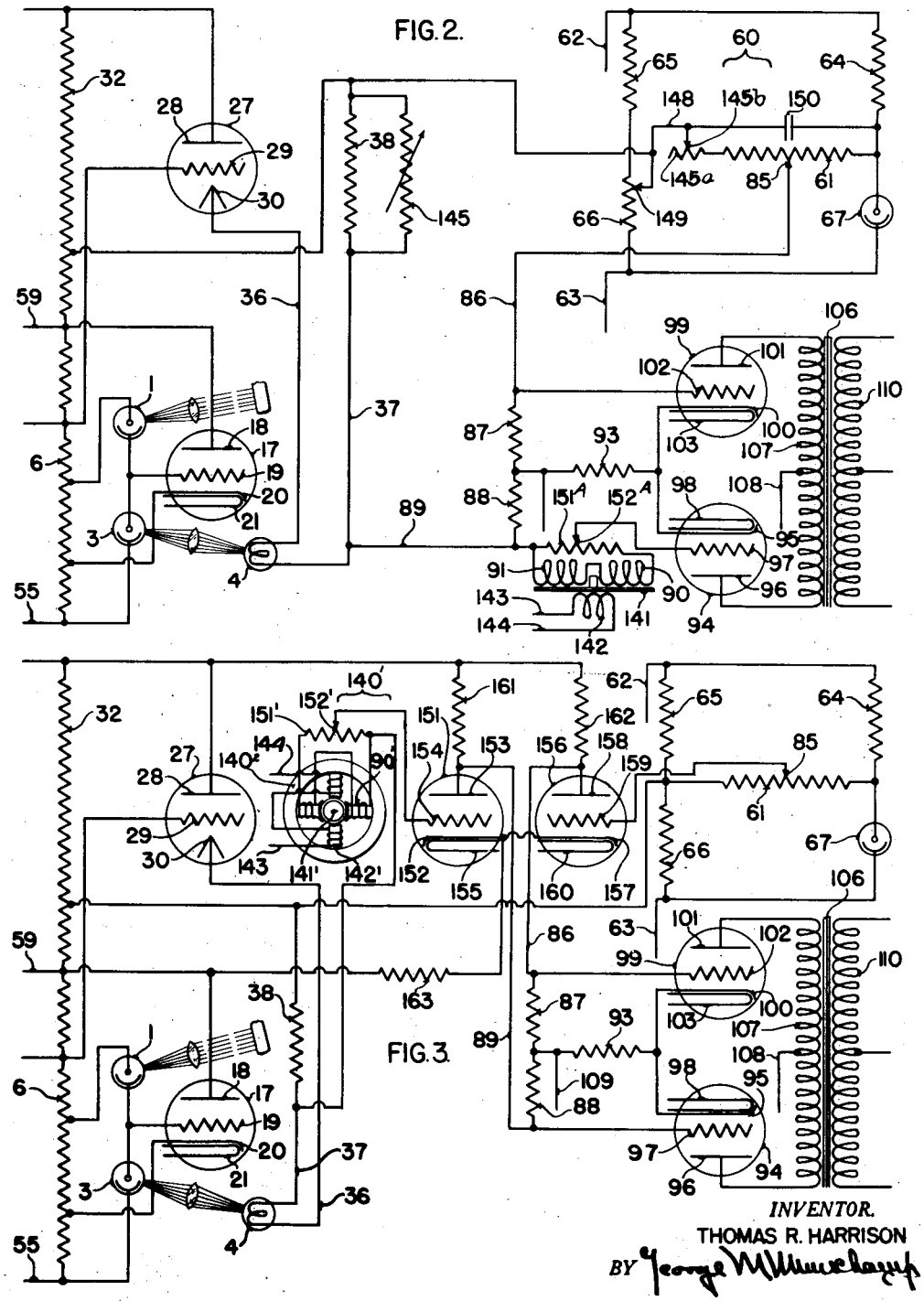

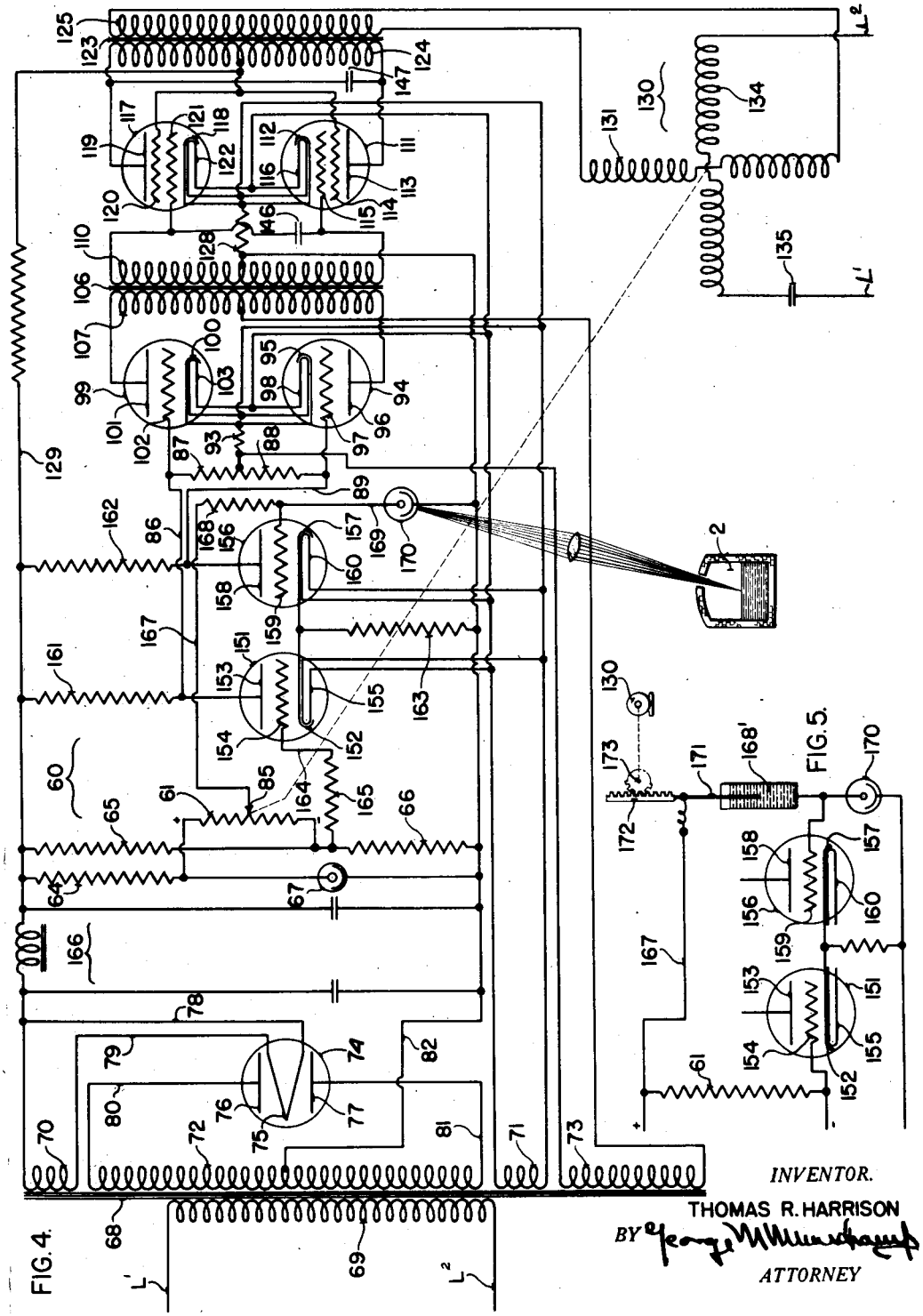

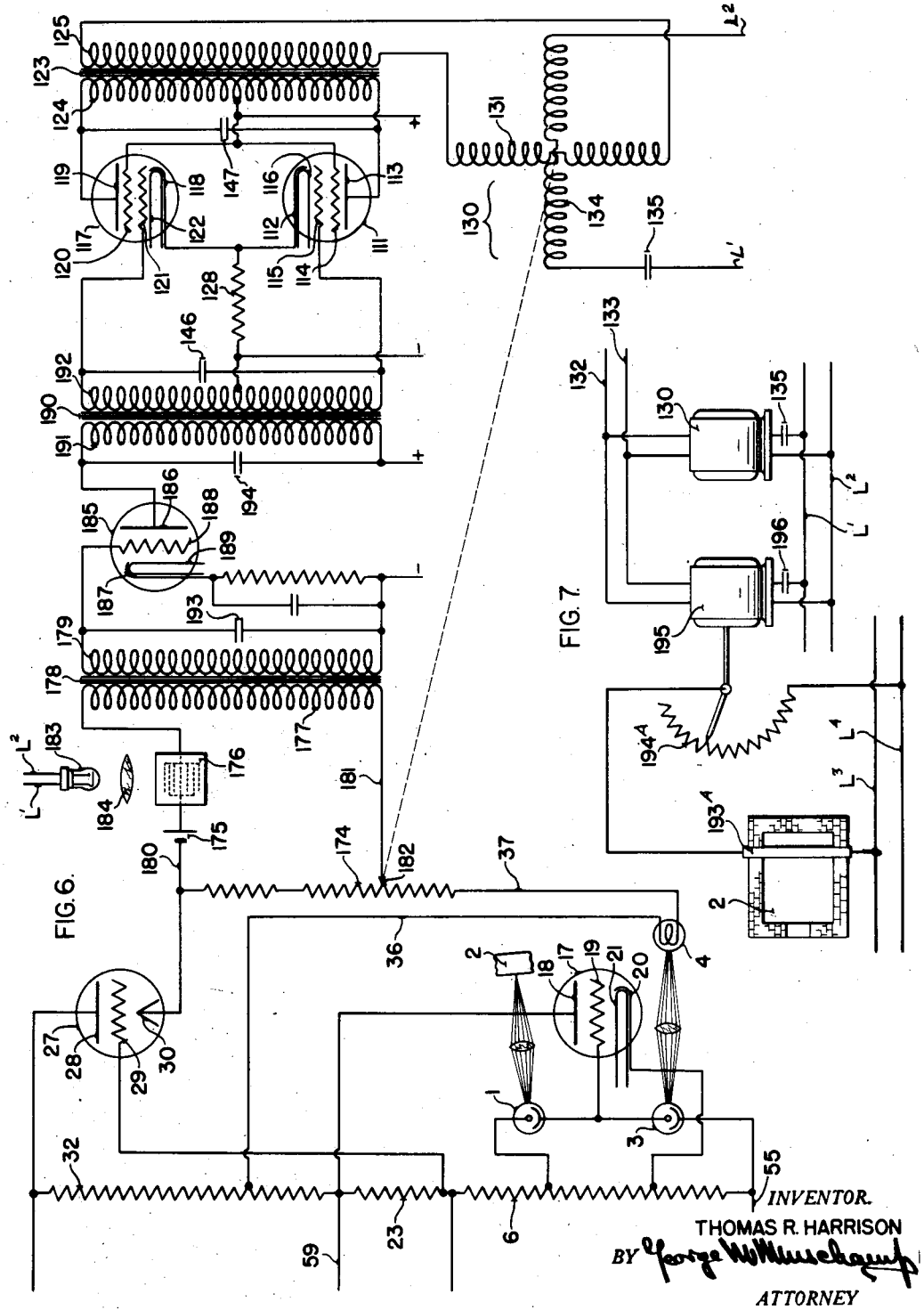

2,245,034

UNITED STATES PATENT OFFICE 2,245,034

MEASURING APPARATUS

Thomas R. Harrison, Wyncote, Pa., assignor to The Brown Instrument Company, Philadelphia, Pa., a corporation of Pennsylvania Application May 29, 1937, Serial No. 145,637

15 Claims. (Cl. 88—23)

The present invention relates to apparatus for ascertaining and continuously recording and/or controlling the magnitude of a variable condition and more particularly the invention relates to self balancing measuring apparatus which is of special utility in recording and/or controlling temperature variations in incandescent bodies.

An object of the invention is to provide radiant-energy responsive apparatus for ascertaining and continuously recording temperature variations in incandescent bodies.

Another object of the invention is to provide apparatus of the type referred to above, which is characterized by being extremely fast in response and self balancing.

A special object of the invention is to provide high speed temperature measuring and recording apparatus in which a light sensitive device may be employed as the condition responsive element, and in which delicate electrical current measuring instruments, such, for example, as microammeters or milli-ammeters are not required nor employed.

In measuring and recording temperature variations in incandescent bodies, it is relatively important in certain applications that the apparatus employed be capable of responding to and recording the variations in a minimum of time. For example, if an accurate record is desired of the variations in temperature throughout their length of successive pieces of material such as bars or billets passing in process through a steel mill, it is of especial importance that the measuring apparatus be capable of a high speed of response. The practicability of employing light sensitive devices or photoelectric cells in making such measurements is readily apparent, since, as is well known, photoelectric cells are characterized by their extreme rapidity of response to variations in light intensity and pass an electric current which bears a definite relation to the temperature of the body from which the light emanates.

Various high speed radiant energy responsive systems utilizing a light sensitive device as the condition-responsive element have heretofore been proposed for measuring and recording temperature variations in incandescent bodies, but all of the proposed systems have been of a deflectional type employing a delicate electrical current measuring instrument and a scale or chart with which the deflecting member or pointer of the instrument is adapted to cooperate. In the proposed systems the radiant light from an incandescent body is ordinarily directed on a photoelectric cell and the electric current passed by the cell is measured by a suitably calibrated electrical current measuring instrument. In some instances, the current passed by the photo-electric cell is first amplified by some form of electronic amplifier and the amplified quantity is measured by a similarly calibrated electrical current measuring instrument. As is apparent the position of the deflecting member or pointer of the instrument relative to the scale thereof will provide a measure of the temperature of the incandescent body, and, if a record is desired, suitable apparatus may be arranged in cooperative relation with the instrument pointer to periodically record its position on a chart, or a pen may be mounted directly on the instrument pointer and arranged to cooperate with a chart to thereby provide a continuous record of the temperature variations. Since the only time lag in recording by the last mentioned method is that required for the instrument pointer to swing up scale, this method has proved to be the most desirable of the prior art devices adapted for utilizing to advantage the high speed of response of the light sensitive elements.

As is well known, however, deflectional measuring instruments are undesirable in many respects for making precision measurements. For example, the calibration of a deflectional measuring instrument is dependent upon the constancy of magnets, springs, jewel bearings, and the level of the instrument, all of which are affected and changed to varying extents by many factors such, for example, as temperature, age, and vibration. Such instruments, furthermore, are limited in respect to the available torque for recording or controlling purposes making necessary the use of narrow and therefore undesirable charts and unsatisfactory control instrumentalities. Such instruments, furthermore, embody charts having non-rectangular coordinates which are undesirable, and ordinarily, the periodicity of response necessarily employed results in sluggish response thereof to small departures.

The above objections have been avoided in the apparatus of my invention by providing a potentiometric network especially adapted to be used with the radiant energy responsive apparatus for recording the measured variations in a minimum of time. In the preferred embodiment of my invention, a photoelectric cell, responsive to the radiant light emanating from an incandescent body whose temperature is to be measurer, is employed to control the potentiometric balance and a reversible electrical motor is arranged to be selectively controlled in response to potentiometric unbalance so that the motor will remain stationary or will be energized for rotation in one direction or the other as the temperature of the incandescent body rises above or falls below a predetermined value. The motor shaft is preferably connected in any convenient manner to the potentiometer rebalancing contact so that energization of the motor is employed to effect movement of the rebalancing contact in the proper direction to rebalance the potentiometer network. As is apparent, the new position of the rebalancing contact will provide a measure of the temperature of the incandescent body and, if desired, a pen may be mounted on the carrier of the rebalancing contact and arranged to cooperate with a suitably calibrated record chart for recording the temperature variations.

In potentiometric measuring apparatus wherein a known or standard voltage is compared to an unknown voltage it is ordinarily desirable to check the standard voltage at frequent intervals to insure the constancy of calibration. Such checking operations, however, are not permissible nor desirable in high speed measuring and recording apparatus because of the additional apparatus and the time required for such operations. Moreover, the standard voltage is ordinarily supplied from suitable batteries provided especially for that purpose. In this respect, my invention has additional practical utility in that the potentiometer voltage may be supplied from any available commercial source of electric current since means have been provided for automatically compensating for fluctuations in the supply line voltage.

The various features of novelty which characterize my invention are pointed out with particularity in the claims annexed to and forming a part of this specification. For a better understanding of the invention, however, and the advantages possessed by it, reference should be made to the accompanying drawings and descriptive matter in which I have illustrated and described a preferred embodiment of the invention.

Of the drawings:

Fig. 1 is a diagrammatic view illustrating one embodiment of the invention as adapted for use in measuring and recording the temperature of an incandescent body;

Fig. 2 illustrates a modification of a portion of the device of Fig. 1;

Figs. 3–6 illustrate further modifications of the device of Fig. 1; and

Fig. 7 is a diagrammatic representation of the use of the invention in a control system.

In Fig. 1 of the drawings, a photoelectric pyrometer is shown in which a photoelectric cell 1 is arranged to receive light from the interior of a furnace or from an incandescent body 2, and a second photoelectric cell 3 is arranged to receive light from a lamp 4, the illumination of which is adapted to be controlled by means responsive to the relative conductivities of the two photoelectric cells. The photoelectric cells are arranged in an electrical bridge circuit and as the temperature of the incandescent body varies, the illumination of lamp 4 is varied until the illumination on the two photoelectric cells is balanced. The magnitude of the lamp energizing current will then be a measure of the magnitude of the condition.

As shown the two photoelectric units are connected in series relation by a conductor 5 and the series arrangement is connected across a suitable portion of a voltage divider 6 by conductors 7A and 8A. The unit 1 is preferably enclosed in a suitable casing (not shown) and the casing is arranged in such manner that the only light which impinges on the unit is that which is to be measured. Desirably the unit 3 is also suitably enclosed and arranged so that it is subject only to light from the lamp 4.

The voltage divider 6 is energized from a transformer 7 which is a combination step-up and step-down transformer and comprises a line voltage primary winding 8 connected to the supply lines $L^1$ and $L^2$, low voltage secondary windings 9, 10, 11, and 12, and high voltage secondary windings 13 and 14. The low voltage secondary winding 9 is connected by conductors 15 and 16 to the heater filament 21 of an electronic valve 17 and supplies energizing current thereto. The electronic valve 17 is a heater type triode and includes an anode 18, a grid 19, a cathode 20, and the heater filament 21. As shown, the anode 18 of valve 17 is connected to the positive terminal of the divider 6 by a conductor 22 through a resistor 23, the cathode 20 is connected to a point on the voltage divider midway between the points of connection of the conductors 7A and 8A thereto, and the grid 19 is connected by a conductor 24 to the conductor 5 between the two photoelectric cells.

The low voltage secondary winding 12 is connected by conductors 25 and 26 to the heater filament or cathode 30 of a second electronic valve 27 and supplies energizing current thereto. The electronic valve 27 is a filament type triode and includes an anode 28, a grid 29, and the filament cathode 30. Anode 28 is connected by a conductor 31 to the positive terminal of a second voltage divider 32 which is energized from the transformer 7 in a manner to be presently explained and the negative terminal thereof is connected to the anode of valve 17. A center point on the filament cathode 30 is connected to a point on the voltage divider 32 which is negative with respect to the point of connection of the anode 28 thereto and has connected in circuit therewith the filament of lamp 4 and a resistor 38. The circuit from cathode 30 to the voltage divider 32 may be traced from cathode 30, conductor 36, lamp 4, conductor 37, resistor 38, and conductor 39 to the voltage divider 32. The lamp 4 is thus arranged to be energized by the anode current flow through the valve 27. As shown, the grid 29 of valve 27 is connected to the lower end of the resistor 23 as seen in Fig. 1 so that as the flow of anode current through the valve 17 varies the potential of grid 29 and thereby the anode current flow through lamp 4 will vary accordingly.

Electronic valves 40 and 46 are also provided, which valves may be conventional full wave rectifiers and are employed to maintain direct current potentials across the voltage dividers 6 and 32, respectively. The filament cathode 43 of valve 40 is connected by conductors 44 and 45 to the low voltage secondary winding 10 and receives energizing current therefrom. The anode plates 41 and 42 of valve 40 are connected by conductors 52 and 53 with the terminals of the high voltage transformer secondary winding 13, and the rectified current is connected across the terminals of a filter 54. A center tap on the secondary winding 13 is connected by a conductor 55 to one terminal of the filter 54 and the other terminal of the latter is connected to the filament cathode 43 so that a direct current voltage is maintained across the filter. The terminals of the filter 54 are connected to opposite ends of the voltage divider 6 so that a steady direct current voltage is maintained across the divider which, due to the filtering action of the filter, is substantially free from alternating components.

Similarly, the filament cathode 49 of valve 46 is energized from the low voltage secondary winding 11 through conductors 50 and 51, the anode plates 47 and 48 are connected by conductors 56 and 57 with the terminals of the high voltage secondary winding 14, and the rectified current is connected across the terminals of a filter 58. A center tap on the secondary winding 14 is connected by a conductor 59 to one terminal of the filter 58 and the other terminal of the latter is connected to the filament cathode 49 so that a direct current voltage is maintained across the filter. The terminals of the filter 58 are connected to opposite ends of the voltage divider 32 and due to the filtering action of the filter a steady direct current voltage substantially free from alternating components is maintained across the divider 32.

When light from the incandescent body 2 is focussed on the photoelectric cell 1, this unit accordingly becomes more conductive and thereby renders the grid 19 of valve 17 more positive relative to the cathode 20 resulting in an increase in the current passing through it and a consequent increase in the potential drop in resistor 23. Thereupon the grid 29 of valve 27 becomes more positive relative to the cathode 30, resulting in an increase in the current conducted by the valve 27 and thereby through the lamp 4. As lamp 4 subsequently brightens, the photoelectric cell 3 becomes more conductive and drives the grid 19 of valve 17 less positive, and since valve 17 controls the potential of grid 29, the latter is also made less positive. This establishes a balanced condition of the illumination of the two photocells, and the energy used by the lamp 4 is then an indication of the value of the light being received by the unit 1.

When photoelectric cells of the vacuum type are employed, this balance of illumination will be exact to a relatively high degree of precision by virtue of the fact that when the voltage across the photoelectric cells is high enough to draw all of the electrons from the cathode to the anode the currents conducted by the photoelectric cells will be constant for all higher voltages. Accordingly only slight unbalance of illumination will be sufficient to swing grid 19 to any degree of bias that may be necessary to restore the balance of illumination.

As was previously noted the current which passes through the lamp 4 also passes through the resistor 38 so that a potential drop is maintained across the resistor 38 which varies in accordance with the illumination received by the photoelectric cell 1 and thereby in accordance with the temperature of the incandescent body. In the preferred embodiment of my invention, this potential drop is opposed to and normally balanced by a measured part of the potential drop maintained across a slidewire resistor 61 by a voltage compensating bridge circuit 60. The importance of maintaining the potential drop across the resistor 61 constant and independent of changes in line voltage will be readily appreciated when it is understood that the voltage drop across resistor 61 is employed as a standard with which the voltage drop across resistor 38 is compared. Any change in voltage across the slidewire resistor 61 is, therefore, not permissible since such change would obviously affect the calibration and stability of operation of the instrument.

As shown, the voltage compensating bridge 60 is energized from a suitable direct current source through conductors 62 and 63 connected to one pair of conjugate points, and includes resistors 64, 65, and 66 as three of its arms, and a glow discharge tube 67 as the remaining arm. The slidewire resistor 61 is connected to the other set of conjugate points. The glow discharge tube 67 comprises two spaced electrodes in a suitable envelope containing inert gas at a pressure such that the tube has a substantially constant drop thereacross when in a continuously conducting state. The resistor 64 is desirably so proportioned that the voltage drop across the glow discharge tube is adjusted to the proper operating value, at which adjustment the voltage across the glow discharge tube will vary only slightly as the voltage of the source changes. By properly proportioning the resistors 64, 65, and 66, for example, by making the resistor 65 large in comparison to resistors 64 and 66, I have found the potential drop across the resistor 66 may be made to vary by the same amount that the potential drop across the glow discharge tube does for the same change in the voltage of the source. Thus, as the line voltage changes, the potential of both ends of the slidewire resistor 61 will rise and fall simultaneously in unison with the line voltage change with the result the voltage drop across the slidewire resistor will remain constant. This arrangement for producing a constant source of direct current potential is being claimed in my copending divisional application Serial Number 193,259 filed March 1, 1938.

The source from which the voltage compensating bridge is energized may be any direct current source of voltage and as shown in Fig. 1 it may be energized through a suitable rectifier circuit from a transformer 68 which is a combination step-up and step-down transformer and comprises a line voltage primary winding 69 connected to the supply lines $L^1$ and $L^2$, low voltage secondary windings 70 and 71, and high voltage secondary windings 72, 73 and 73a. The rectifier circuit referred to may be similar to the rectifier circuits including the rectifier valves 40 and 46, and includes a rectifier valve 74 having a filament cathode 75 connected by conductors 78 and 79 to the terminals of the low voltage transformer secondary winding 70 and receiving energizing current therefrom. The anode plates 76 and 77 of valve 74 are connected by conductors 80 and 81 to the terminals of the transformer secondary winding 72. A center tap on the secondary winding 72 constitutes the negative terminal and the filament 75 constitutes the positive terminal of the rectifier. The positive terminal of the rectifier is connected to one energizing terminal of the voltage compensating bridge 60 through a suitable resistor 83 by the conductor 62 and the negative terminal thereof is connected by the conductor 63 to the other energizing terminal of the bridge. If desired, a suitable filter may be connected between the rectifier and the voltage compensating bridge 60, but I have found that it is not necessary to supply pure direct current voltage to the bridge 60 in this arrangement and that very satisfactory operation is had when full wave rectified pulsating current is supplied to the bridge.

It will thus be noted the potential drop across the resistor 38 is arranged to be opposed to and balanced by a variable portion of the potential drop across the slidewire resistor 61 which remains substantially constant even with wide variations in the potential of the supply lines L¹ and L². As shown, the resistor 38 is connected in a series circuit with the slidewire resistor 61 which may be traced from the negative side of resistor 38, conductor 84, to the negative end of slidewire resistor 61, slidewire contact 85, conductor 86, resistors 87 and 88, conductor 89, a pair of induction generator windings 90 and 91, and conductor 87 to the positive side of resistor 38. The point of connection of the resistors 87 and 88 is connected through a cathode biasing resistor 93 to the cathodes 95 and 100 of a pair of electronic valves 94 and 99, and opposite ends of the resistors are connected to the valve grids 97 and 102, respectively.

The valves 94 and 99, which may be heater type triodes as shown, are preferably contained in the same envelope and their purpose is to convert the unbalance direct current flows through the resistors 87 and 88 into alternating currents which may be further amplified and employed to selectively control the energization of a reversible alternating current motor. The valve 94 includes the cathode 95, an anode 96, a grid 97, and a heater filament 98, and the valve 99 includes the cathode 100, an anode 101, a grid 102, and a heater filament 103. As shown, the heater filaments 98 and 103 are connected in parallel relation and receive energizing current through conductors 123A and 124A from the low voltage transformer secondary winding 71.

The anodes 96 and 101 are connected to opposite terminals of the primary winding 107 of a transformer 106 by conductors 104 and 105, respectively. A center tap on the transformer primary winding 107 is connected by a conductor 108 to one terminal of the transformer secondary winding 70 and the other terminal of the secondary winding is connected by a conductor 109 to the negative end of the resistor 93 and therethrough to the cathodes 95 and 100. Thus alternating voltage is supplied to the anode circuits of the valves 94 and 99 and the pulsating current conducted by these valves is adapted to be varied by the flow of direct current through the resistors 87 and 88. The result is that pulsating anode current will flow through the transformer primary winding 107 which will vary in phase and magnitude in accordance with the direction and magnitude of the direct current flow through the resistors 87 and 88, and thereby an alternating voltage will be induced in the secondary winding 110 of the transformer 106 which will also vary in phase and amplitude accordingly.

When the grids 97 and 102 are at the same potential both triodes 94 and 99 will be equally conductive and the pulsating anode current flows through opposite halves of the transformer primary winding 107 will induce magnetomotive forces in the transformer which are equal and opposite with the result that no voltage will be induced in the secondary winding 110. When the potential drop across the resistor 38 becomes less than that across the variable portion of the slidewire resistor 61 connected in circuit, an unbalance current will flow through resistors 87 and 88 in a downward direction as seen in Fig. 1 and the potential of grid 102 will then become less negative with respect to the cathode 100 and the grid 97 will become more negative with respect to the cathode 95. The triode 99 is thereby rendered more conductive and the triode 94 is rendered less conductive resulting in the induction of an alternating voltage of corresponding phase across the terminals of the transformer secondary winding 110. As will be apparent to those skilled in the art either resistor 87 or 88 may be omitted and the remaining resistor may be made zero in value without fundamentally changing this principle of operation.

The alternating voltage so induced in the secondary winding 110 is impressed on the input circuits of a second pair of electronic valves 111 and 117. The valve 111 includes a cathode 112, an anode 113, a screen grid 114, a control grid 115, and a heater filament 116, and the valve 117 includes a cathode 118, an anode 119, a screen grid 120, a control grid 121 and a heater filament 122. As shown the heater filaments 116 and 122 are connected in parallel relation and receive energizing current from the low voltage transformer secondary winding 71 through conductors 123A and 124A. One terminal of the transformer secondary winding 110 is connected to the control grid 121, the other terminal is connected to the control grid 115, and a cathode biasing resistor 128 is connected between a center tap on the secondary winding 110 and the cathodes 112 and 118 which, as shown, are connected together. The anodes 113 and 119 are connected to opposite terminals of the primary winding 124 of a transformer 123 by conductors 126 and 127, respectively. A center tap on the transformer primary winding 124 is connected by a conductor 129 to the positive terminal of the rectifier and the negative terminal of the rectifier is connected to the negative end of the cathode biasing resistor 128 by conductor 92 and therethrough to the cathodes 112 and 118 so that full wave pulsating rectified current voltage is maintained on the anode circuits of the valves 111 and 117.

In operation when an alternating voltage appears across the terminals of the transformer secondary winding 110, the potentials of grids 115 and 121 are swung, in opposite phase, at a frequency corresponding to the supply line frequency and the valves 111 and 117 are each alternately rendered conductive and non-conductive, one valve being conductive while the other is non-conductive. The resulting pulsating current flows through the transformer primary winding 124 in successively opposite directions through the opposite halves of the transformer result in the induction of an alternating voltage of line frequency in the transformer secondary winding 125 whose phase and amplitude is determined by the direction and magnitude of the unbalance current flows through the resistors 87 and 88.

The terminals of the transformer secondary winding 125 are connected to one phase winding 131 of a two phase rotating field motor 130 by conductors 132 and 133 and the other phase winding 134 of the motor is connected to the supply lines L¹ and L² through a suitable condenser 135. Due to the action of condenser 135 the current flow through the motor winding 134 will lead the line current by approximately 90° and since the motor winding 131 is arranged to be energized by currents in phase or 180° out of phase with the line current, the magnetic fields set up by these windings will be displaced by approximately 90° in space with the result that a rotating magnetic field will be set up in the motor in one direction or the other and the motor rotor will accordingly be rotated in a corresponding direction. Thus, depending upon the direction of the potentiometric unbalance current flow through the resistors 87 and 88, the motor will be selectively energized for rotation in one direction or the other, and it will be apparent the motor speed will be directly dependent upon the magnitude of the unbalance current flow.

As shown, condensers 146 and 147 are connected in shunt to the transformer windings 110 and 124, respectively. Due to the action of condenser 146 a full wave electromotive force is impressed upon the grids 115 and 121 from the half wave impulses impressed upon winding 107 through the half wave rectifying action of tube 94 or 99. The condenser 147 tunes to resonance the transformer 123 and its load consisting of the motor windings so that the current flows through the motor winding 131 will be at a maximum value for any unbalance current flow through the resistors 87 and 88.

As shown in Fig. 1 the shaft of motor 130 is connected in any convenient manner to a shaft 136, which may desirably be a rod having a spiral groove thereon, and the potentiometer contact 85 is mounted on a carriage carried by shaft 136 and is adapted to be moved in one direction or the other as the shaft 136 is rotated. Thus, when the motor 130 is energized for rotation as a result of a change in the potential drop along the resistor 38, the motor effects an adjusting movement of the contact 85 along the slidewire resistor 61 in the proper direction until the effective potential drop along the slidewire resistor is equal to that across resistor 38. The unbalance current flow through the resistors 87 and 88 will then be reduced to zero and the motor will come to rest with the contact 85 at a new position along the slidewire which position will then be a measure of the value of light falling on the photoelectric cell 1 and thereby of the temperature of the incandescent body 2.

Desirably, a pen mounted on the carriage which carries the potentiometer contact 85, is arranged to cooperate with a recorder chart 137 and to thereby provide a continuous record of the temperature of the incandescent body 2. The recorder chart is adapted to be driven by a continuously rotating roller 138 and the latter is driven in any convenient manner, as for example, by a unidirectional motor 139 through suitable gearing 140A, so that a record of the temperature of the incandescent body will be had as a continuous line on the chart.

In order that the speed of motor 130 may be as great as possible during rebalancing without overshooting of the balance point and consequent hunting taking place, means have been provided to ensure that the motor speed and rate of change of its speed is substantially proportional to the extent of unbalance. This result is obtained in Fig. 1 by introducing into the network, in series with the unbalance voltage, a voltage whose magnitude is a function of the motor speed. This damping feature although obtained electrically herein is substantially the same as that disclosed in my prior Patent 1,827,520, issued Oct. 13, 1931, in which the rate of rebalance of a potentiometric measuring circuit and arresting of the motive means when the rebalancing movement has been proportional to the unbalance are controlled by mechanical means. Thus, as the slidewire contact 85 approaches its new balance position, the unbalance voltage will decrease in value and if the motor speed is then such that it would ordinarily coast beyond the balance position due to its inertia, the opposing voltage which is introduced in circuit will be appreciably greater than the unbalance voltage and will tend to effect energization of the motor in the opposite direction and thereby produce a positive damping action which will check the motor speed before balance is reached and gradually reduce it to zero as the unbalance is reduced to zero. Specifically a pair of opposed windings 90 and 91 of an induction disc generator 140 are connected in series relation with the resistors 38, 61, 87 and 88, and the windings 90 and 91 are so arranged that the generated voltage will be opposed to the unbalance voltage between the potential drops across the resistor 38 and slidewire 61.

The induction disc generator 140 comprises a rotatable aluminum or copper disc 141 which may be driven directly from the motor shaft or through suitable gearing, as desired, having a winding 142 connected by conductors 143 and 144 to the terminals of the transformer secondary winding 73a and receiving energizing current therefrom. The winding 142 is arranged on one side of the disc in such manner that the alternating magnetic flux set up by it will pass through the disc, and the opposed windings 90 and 91 are arranged side by side on the opposite side of the disc in such positions relative to the winding 142 that when the disc 141 is stationary equal numbers of lines of the alternating magnetic flux set up by winding 142 will pass through them. Thus equal and opposite alternating voltages will be induced in the windings 90 and 91 with the result that normally the resultant damping voltage will be zero. When the disc 141 is rotated, however, the alternating magnetic flux set up by the winding 142 is distorted, and depending on the direction of rotation of the disc, more lines of flux will pass through one opposed winding 90 or 91 than the other, resulting in the appearance of an alternating voltage across the terminals of these windings.

This induced voltage will be substantially in phase with the line voltage or displaced 180° therefrom depending upon the direction of rotation of the disc 141, and as is apparent, the amplitude of the induced voltage will be directly dependent upon the speed of rotation of the disc. For example, if the speed of rotation of the disc is small, the degree of distortion of the alternating magnetic field set up by the winding 142 is correspondingly small, and as a result the voltages induced in the windings 90 and 91 will be nearly equal so that their resultant voltage is small. As the speed of rotation of the disc becomes greater, however, the degree of distortion of the magnetic field will become greater, and thereby the voltage induced in one or the other of windings 90 and 91 will become greater to a corresponding extent than the voltage induced in the other winding.

In the arrangement of Fig. 1 it will be noted that should the slidewire contact 85 become momentarily or temporarily disengaged from the slidewire 61 during rebalancing, the flow of the unbalance and damping currents through the resistors 87 and 88 will be interrupted with the result that grids 97 and 102 of valves 94 and 99, respectively, will assume identical negative potentials due to the action of the cathode biasing resistor 93 and thereby reduce the pulsating current flows conducted by the valves to negligible values. As is readily apparent, the motor 130 will then be deenergized, but if it happened to be speeding when the contact 85 and slidewire resistor 61 became disengaged. it may coast beyond the new balance position since such disengagement also results in removal of the damping voltage introduced into the network by the induction disc generator 140. If contact between the slidewire resistor 61 and contact 85 is subsequently made, as is normally the case, the motor will be energized for rotation in the opposite direction and effect adjustment of the contact 85 back to the balance position, but it should be noted the recording pen will have followed and recorded the hunt of the motor so that a true record of the temperature variations of the incandescent body will not be had.

An obvious method of overcoming this objection is to make the contact pressure between the slidewire resistor 61 and contact 85 great enough to prevent disengagement therebetween. While effective, this method, however, is not the most desirable one in certain applications because of resulting frictional wear between the contact and resistor. Another and more desirable method is that illustrated, more or less diagrammatically, in Fig. 2. For purposes of simplification only, a portion of the device of Fig. 1 has been shown in the modification of Fig. 2. In this modification it will be noted the induction disc generator windings 90 and 91 are connected in a local circuit including the grids 97 and 102, but not the resistors 38 and 61. As seen in Fig. 2 one terminal of the arrangement comprising the generator windings 90 and 91 connected in series is connected to the grid 97 and the other terminal is connected to the bottom end of resistor 38. It will be understood the windings 90 and 91 may just as readily be connected between the grid 102 and the top end of resistor 37.

In this arrangement it will be seen that if, during rebalancing, the contact 85 should become momentarily or temporarily disengaged from the slidewire resistor 61 the motor 130 will not be totally deenergized and permitted to coast, but will be energized for rotation in the opposite direction by the amplified quantity of the damping voltage and will quickly come to rest. If the contact 85 subsequently engages the slidewire resistor 61 and the balance position is not yet reached, the motor will be energized for rotation in the direction in which it was previously running, and due to the action of the damping voltage will come to rest precisely on the balance position. Thus much smaller contact pressures may be employed between the contact 85 and resistor 61 in the arrangement of Fig. 2 than in the arrangement of Fig. 1 and consequently the life of the contact and resistor may be materially increased.

In commercial applications it is usually desirable to provide means for facilitating the necessary calibrating and adjusting operations, and as shown means have been provided especially for this purpose in the modification illustrated in Fig. 2. As shown a resistor 145 is connected in shunt to the resistor 38 for adjusting the potential drop across the latter to a desirable value and suitable means have been provided in the bridge circuit 60 for adjusting the potential drop across the slidewire resistor 61 to a correspondingly desirable value. The latter means includes a resistor 145a connected in series with the resistor 61 and a cooperating contact 145b. Contact 145b is connected by a conductor 148 to a contact 149 which is arranged to be moved along the bridge resistor 66 for precisely adjusting the voltage compensation of the bridge 60. I have found that by varying the position of contact 149 along resistor 66 full compensation for line voltage variations, or under compensation or over compensation may be had as desired. Means have also been provided in the form of a condenser 150 connected in shunt to resistors 61 and 145a for filtering out any alternating components in the current flow through resistor 61. Furthermore, provision has been made in this arrangement in the form of a resistor 151A connected in shunt to the induction disc generator windings 90 and 91 and a cooperating contact 152A for adjusting the damping voltage introduced into the network to a desirable value.

In Fig. 3, I have illustrated a further modification of the device of Fig. 1 wherein an additional stage of amplification energized from a suitable direct current source which may desirably be the potential drop across voltage divider 32, is provided for measuring the potential drop across resistor 38. As shown, the additional stage of amplification referred to includes a pair of electronic valves 151 and 156. The valves 151 and 156, which may desirably be included in the same envelope, are heater type triodes. Valve 151 includes a cathode 152, an anode 153, a control grid 154, and a heater filament 155, and valve 156 includes a cathode 157, an anode 158, a grid 159, and a heater filament 160.

As shown the valves 151 and 156 are connected in parallel relation with the cathodes 152 and 157 connected together, and the positive ends of resistors 161 and 162, which are connected in the anode circuits of valves 151 and 156, respectively, are connected together. The potential drop across resistor 38 is impressed on the grid circuit of valve 151 and the potential drop across a variable portion of the slidewire resistor 61 is impressed on the grid circuit of valve 156. The heater filaments 155 and 160 may be connected in parallel with the heater filaments 95 and 103 of valves 94 and 99 and receive energizing current from the transformer secondary winding 71 or a separate transformer secondary winding may be provided for this purpose, if desired. Anode voltage is supplied to the valves from the terminals of voltage divider 32 which may be energized from a filter 58 as shown in Fig. 1, and as shown, the anodes 153 and 158 are connected together through resistors 97 and 99 by conductors 88 and 89. The anodes are connected to the positive side of voltage divider 32 and the cathodes are connected through a cathode biasing resistor 163 to the negative side. It will be noted that by connecting the resistor 163 to a point on the voltage divider which is more negative than the point of connection of the resistor 38 thereto that the change in bias on grids 154 and 159 required to effect balance of the system for the maximum change in voltage across resistor 38 is much less than it would have to be if both of these resistors were connected to the same point on the voltage divider.

When the grids 154 and 159 are at the same potential, the valves 151 and 156 will be equally conductive or substantially so and the potential drops across resistors 161 and 162 connected in the anode circuits of the valves will be equal so that the anodes 153 and 158 will be at the same potential, and thereby the grids 97 and 102 of valves 94 and 99 will be at the same potential. Upon variation in the light falling upon the photoelectric cell 1, the current conducted by valve 27 will be varied as hereinbefore explained, and a change in potential across the resistor 38 will result. As is apparent, the potential of grid 154 will then also be varied with respect to the cathode 152 with the result that the conductivity of valve 151 will be rendered different from that of valve 156 and thereby the potential of anode 153 will be rendered different from that of anode 158. Thus a slight inequality between the potential drops across resistor 38 and the effective portion of resistor 61 produces a magnified potential difference between the anodes 153 and 158. Since the grids 97 and 102 are connected to the anodes 153 and 158, respectively, one of the valves 94 or 99 will be rendered more conductive than the other, and thereby will cause the motor 130 to be energized for rotation in one direction or the other as explained in connection with Fig. 1. The contact 85 may desirably be connected to and driven by the motor shaft in this arrangement as in the arrangement of Fig. 1 so that the resulting energization of motor 130 may be employed to effect an adjustment of the contact 85 along resistor 61 in the proper direction to change the potential on grid 159 to correspond to that on grid 154 and thereby reduce the unbalance current flow through the resistors 87 and 88 to zero.

In this arrangement as well as in the arrangements of Figs. 1 and 2, means have been provided for arresting the motion of the motor when the movement of contact 85 has been proportional to the change in the value of light falling on the photoelectric cell 1. Although an induction disc generator 140 of the type shown in Figs. 1 and 2 may conveniently be employed for arresting the motion of motor 130, it will be noted that in this modification a four pole generator 140¹ is provided for this purpose. A winding 142¹ which may be energized from a suitable source of alternating current, for example, from the transformer secondary winding 73a of Fig. 1, is wound on two diametrically opposite poles and a winding 90¹ is wound on the remaining pair of diametrically opposite poles. A rotor 141¹, which is made up of iron laminations forced into a copper cylinder, is arranged to be rotated between the poles and operates as does the disc 141 of the induction disc generator 140 to distort the magnetic field set up by the winding 142¹. When the rotor 141¹ is at rest it will be seen that substantially no lines of alternating magnetic flux thread the winding 90¹ so that the voltage across the terminals of the latter winding is zero. When the rotor 141¹ is rotated, however, as by the motor 130, for example, the alternating magnetic flux set up by the winding 142¹ will be distorted and as a result lines of magnetic flux will thread the winding 90¹ and induce a voltage in the latter of phase and magnitude corresponding to the direction and speed of rotation of the rotor 141¹. As shown a resistor 151¹ is connected across the terminals of the winding 90¹ and a variable portion of the resistor is connected between the grid 154 of valve 151 and the positive end of resistor 38.

Thus, as the motor 130 gains speed, a counter voltage will be introduced into the network which tends to drive the grid 154 in the opposite direction from that in which it was driven by the change in the value of light falling on the photoelectric cell 1 with the result that as the balance position is reached, the motor speed is quickly reduced and becomes zero in value when the grids 154 and 159 are again at the same potential. It should be noted that a fundamental distinction which exists between the induction disc generators 140 and 140¹ is that when the induction disc 141 is at rest zero voltage is induced across the terminals of windings 90 and 91 because the voltage induced in winding 90 by the alternating magnetic flux threading it, is equal and opposite to the voltage induced in winding 91 by the alternating magnetic flux threading the latter, whereas no voltage is induced in winding 90¹ of generator 140¹ when rotor 141¹ is at rest by virtue of the fact that no lines of alternating magnetic flux then thread winding 90¹. The generator 140¹ is thus seen to operate in a manner similar to the modification of the induction disc generator 140 considered hereinbefore.

In Fig. 4, I have illustrated, more or less diagrammatically, a further modification of my invention in which only one photoelectric cell is employed in measuring the temperature of the incandescent body 2. It will be noted that in this arrangement, a pair of electronic valves 151 and 156 are connected in the manner described in connection with Fig. 3 for varying the potentials on grids 97 and 102 of valves 94 and 99, respectively, upon variation in the value of illumination received by a photoelectric cell 170 and thereby inducing an alternating voltage in the transformer secondary winding 110 which may be further amplified and applied to one phase winding of a motor 130 for causing selective rotation thereof. In this arrangement, the potentials on the valve grids 154 and 159 are not controlled in the same manner, however, as they are in the Fig. 3 arrangement for recording the variation in the temperature of the incandescent body 2.

As shown in Fig. 4 the grid 154 of valve 151 is connected by a conductor 164, in which a resistor 165 is inserted, to the negative end of a slidewire resistor 61. The slidewire resistor 61 is desirably connected in a voltage compensating bridge 60 which may be similar to the correspondingly identified part of Fig. 1. The voltage compensating bridge 60 of Fig. 4 may be energized from any suitable direct current source and as shown is arranged to be energized from a rectifier, which may desirably be the rectifier shown as energized by the transformer 68 in Fig. 1. In Fig. 4 it will be noted, however, a suitable filter 166 is connected between the rectifier and the bridge 60 so that a substantially pure direct current voltage is supplied to the bridge 60 in this arrangement. The grid 159 of valve 156 is connected by a conductor 167, in which a resistor 168 is inserted, to the slidewire contact 85, and is also connected by a conductor 169 to the anode of the photoelectric cell 170, the cathode of which is connected to the negative side of filter 166. The cathodes 152 and 157 are connected together and through a resistor 163 to the negative side of filter 166.

It will thus be apparent the relative potentials on grids 154 and 159 will be substantially identical even with line voltage variations when the system is balanced. In operation, the potential on grid 154 is determined by the potential of the negative end of the slidewire resistor 61, and the potential on grid 159 will be determined by the potential of the negative end of the slidewire resistor 61 plus or minus the difference between the potential drop across the effective portion of the slidewire resistor 61 and the potential drop across resistor 168 produced by the flow of current conducted by photoelectric cell 170.

When light from the incandescent body 2 is focussed on the photoelectric cell 170, this unit accordingly conducts more current and thereby increases the potential drop across resistor 168 and renders the grid 159 of valve 156 more negative than the grid 154 of valve 151, resulting in a decrease in the current conducted by valve 156 and an increase in current conducted by valve 151 by virtue of the change in the potential drop across the cathode biasing resistor 163. The potential on the anode 158 of valve 156 will then be more positive than the potential on the anode 153 of valve 151 and as a result the grid 97 of valve 94 will be rendered less negative with respect to its corresponding cathode 95 and the grid 102 of valve 99 will be rendered more negative with respect to its corresponding cathode 100, resulting in the appearance of an alternating voltage across the terminals of the transformer secondary winding 110 as described in connection with Fig. 1. This alternating voltage may then be further amplified and the amplified quantity applied to the phase winding 131 of motor 130 as shown. The motor phase windings are so arranged in relation to the remainder of the circuit that the resulting rotation of the motor will then be in the proper direction to adjust the contact 85 in an upward direction as seen in Fig. 4 to thereby raise the potential on grid 159 and consequently to reduce the unbalance current flow through the resistors 87 and 88. The motor energizing current will thus be reduced to zero and subsequently the motor will come to rest. The new position of the contact 85 along the resistor 61 will then be a measure of the value of the illumination falling on the photoelectric cell 170 and thereby of the temperature of the incandescent body 2 and if desired, a chart 137 as shown in Fig. 1 may be arranged in relation to the slidewire resistor 61 and a pen may be mounted on the carrier of the contact 85 for recording the variations in the temperature of the incandescent body. A fundamental characteristic of a vacuum type photoelectric cell is that the current conducted by the cell is a function of the light impinging on it and is independent of the voltage applied across the cell provided the voltage is sufficient to draw to the anode all of the electrons liberated by the cathode by the light falling upon it. Thus the potential drop across the resistor 168 will provide an accurate measure of the illumination on photoelectric cell 170 even if line voltage variations occur. It should be noted, therefore, that since a constant voltage is maintained across the slidewire resistor 61 and the system is balanced when the potential drop across the effective portion of the slidewire is equal in value to the potential drop across resistor 168, the position of the contact 85 at which the system is balanced will provide an accurate measure of the illumination on cell 170.

If desired, an induction disc generator 140 may be provided as in the previous arrangements for checking the speed of the motor during rebalancing so that overshooting and consequent hunting will be minimized. If this feature is desired the induction disc primary winding may be energized from a transformer secondary winding 73a as shown in Fig. 1 and the windings 90 and 91 may be connected in circuit with the grid 154 of valve 151 and the resistor 165 in the conductor 164, as shown in Fig. 3 or they may be connected in circuit between the grid 97 and the lower end of resistor 88 as shown in Fig. 2. In either case, the induction disc generator will introduce a countervoltage into the network as the motor gains speed and rotates the induction disc during rebalancing which will tend to effect energization of the motor in the opposite direction, and when the flow of unbalance current through the resistors 87 and 88 has been reduced to a small value, this countervoltage will be predominant and quickly check the motor.

In Fig. 5, I have illustrated more or less diagrammatically a modification of the arrangement of Fig. 4 which is of special utility in decreasing the sensitivity of the instrument at relatively low values of temperature. In this arrangement it will be noted the point of connection of conductor 167 to the slidewire resistor 61 is fixed and a resistor $168^1$, employed in lieu of the resistor 168 of Fig. 4, is varied in effecting rebalance of the system upon a change in the temperature of the incandescent body 2. As the photoelectric current varies it will be noted the resistance of resistor $168^1$ is varied until the potential drop thereacross is restored to its initial value. In thus effecting rebalance, the resistance of resistor $168^1$ is seen to vary inversely with the photoelectric current and it will be apparent that when the photoelectric current is small a larger change in resistance $168^1$ will be required to rebalance than when the photoelectric current is large. Thus, if a recorder chart is arranged in relation to the resistor $168^1$, it will be seen that at low temperatures large changes in resistance $168^1$ will be required to balance small changes in photoelectric current so that a relatively narrow range of temperatures will be recorded over a large part of the chart.

As shown the resistor $168^1$ may desirably be of a liquid type consisting of a suitable cylinder in which a suitable liquid, such, for example, as a dilute solution of sulphuric acid, is contained, and a conductor 171 which is adapted to be moved into and out of the liquid when it is desired to vary the effective resistance in circuit. The conductor 171 may be moved into and out of the solution in any convenient manner to rebalance the system upon variation in the illumination on the photoelectric cell 170, and as shown is mechanically connected to a rack 172 with which a pinion 173, driven through suitable gearing by the reversible electrical motor 130, is adapted to cooperate. If desired a pen may be connected to the rack 172 and arranged in suitable relation to a recorder chart to thereby provide a record of the variations in the temperature of the incandescent body 2.

In Fig. 6, I have illustrated a further modification of the device of Fig. 1 in which the energy supplied to lamp 4 is measured by an arrangement including a resistor 174 which may be connected in series with the lamp 4 in the cathode circuit of valve 27, and is also connected in a potentiometer circuit including a battery 175 of constant voltage, a selenium cell 176, and the primary winding 177 of a transformer 178. The potentiometer circuit may be traced from the top end of resistor 174 as seen in Fig. 6, conductor 180, battery 175, selenium cell 176, transformer primary winding 177, conductor 181, and contact 182 which is arranged to be moved along the resistor 174. Thus, the potential drop produced across a portion of the resistor 174 is arranged to be opposed to and normally balanced by the electromotive force of battery 175. It will be understood a voltage compensating bridge 60 similar to that shown in Fig. 1 may be provided and a suitable portion of the potential drop across resistor 61 may be employed in lieu of the battery 175, if desired. When the opposed voltages become unequal in value, unbalance current flows in the potentiometer circuit through the selenium cell 176 and the transformer primary winding 177 in one direction or the other depending on which voltage is the greater.

In this modification the unbalance current flow through the selenium cell 176 is converted into a pulsating current flow by subjecting the selenium cell to a light source of varying intensity. It is characteristic of a selenium cell to vary in electrical resistance in accordance with the amount of light transmitted to it so that when the cell is subjected to regular flashes of light, the current flow conducted thereby will be intermittent. When this pulsating current passes through the transformer primary winding 177 an alternating voltage of corresponding phase and magnitude will be induced in the secondary 179 thereof which may be readily amplified by the use of one of various known forms of electronic amplifiers.

The variable source of light referred to may advantageously take the form of a neon lamp 183 having its terminals connected to the alternating current supply conductors $L^1$ and $L^2$ so that the lamp emits light varying in intensity as the current supplied by the conductors $L^1$ and $L^2$ varies in direction and magnitude. Desirably one electrode of the neon lamp 183 is shielded from the selenium cell 176 so that a flash of light will be received thereby only during one-half of each complete cycle of the alternating current supplied by the conductors $L^1$ and $L^2$. One electrode of lamp 183 may be in the form of a relatively small plate and the other electrode in the form of a larger plate disposed between the smaller plate and the selenium cell 176 so that the larger plate completely shields the smaller plate from the cell 176 and the latter will thereby be responsive to the source 183 during only one-half of each cycle. The purpose of so shielding one electrode of the lamp 183 is to permit selective energization of reversible motor 130 when the lamp 183 is energized from the same source of alternating current supply as the motor phase winding 134. As shown, a suitable converging lens 184 may be interposed between the lamp 183 and the selenium cell 176, if desired.

Thus, when unbalance potentiometric currents flow through the selenium cell 176, the latter will transform the unbalance currents into pulsating currents of regular frequency which may be readily amplified, as for example, by an electronic valve 185 and a cooperating pair of electronic valves 111 and 117 which may be identical with the correspondingly identified parts of Fig. 1. The electronic valve 185 is a heater type triode and includes an anode 186, a cathode 187, a grid 188 and a heater filament 189. The alternating voltage induced across the terminals of transformer secondary 179 is impressed on the input circuit of the valve 185 and the output circuit of the latter is connected in a circuit with the primary winding 191 of a transformer 190 and a suitable source of direct current voltage. The source of direct current voltage may be supplied from a transformer 68 through a rectifier tube 74 as shown in Fig. 1, for example, and heater current may also be supplied to the filament 189 from a suitable secondary winding on the transformer 68. A condenser 193 connected across the transformer secondary winding 179 reduces the impedance of the latter to the flow of induced currents therethrough, and renders the corresponding portion of the circuit resonant so that the voltage on the control grid 188 of valve 185 will be precisely in, or 180° out of phase with the voltage of the supply lines $L^1$ and $L^2$. A condenser 194 connected across the transformer primary winding 191 reduces the impedance of the latter and thereby increases the magnitude of the current flow in the transformer secondary winding 192.

Thus, when an alternating voltage is induced across the terminals of transformer secondary winding 179, pulsating current will be conducted by the valve 185 and the transformer primary winding 191 with the result that an alternating voltage will be induced across the transformer secondary winding 192. This voltage is impressed on the input circuits of valves 111 and 117 where it is further amplified and the amplified quantity is applied to the motor phase winding 131 as described in connection with Fig. 1. The shaft of motor 130 may be connected through suitable gearing in any convenient manner to the contact 182 so that when the motor is energized for rotation, the contact 182 will be adjusted along the resistor 174 in the proper direction to reduce the unbalance current flow in the potentiometer circuit to zero. If desired, an induction disc generator 140 may be connected in the potentiometer circuit as shown in Fig. 1 or in the input circuits of either valve 185 or valves 111 and 117 for checking the speed of motor 130 during rebalancing to thereby minimize overshooting and consequent hunting.

If desired, a chart 137 as shown in Fig. 1 may be arranged in cooperative relation with the slidewire resistor 174 and a pen may be mounted on the contact 182 for recording the variations in the temperature of the incandescent body 2.

It will be apparent that motor 130 may be employed to operate a control valve or a rheostat for governing the application of an agent to a furnace for producing heat, for example, to the radiant energy of which the photoelectric cell 1 or 170 is responsive, or another motor desirably operated together with the motor 130 may be so employed. For example, as shown in Fig. 7, a furnace 2, to the radiant energy of which the photoelectric cell 1 or 170 is responsive, is heated by a resistor 193A which is connected to electric supply conductors $L^3$ and $L^4$ through a rheostat 194A, the adjustment of which is effected by a motor 195. The motor 195 may be exactly like the motor 130, and in Fig. 7 is shown as having one phase winding connected to the conductors 132 and 133 which are connected to the terminals of transformer secondary winding 125, and the other phase winding is connected through a condenser 196 to the supply lines $L^1$ and $L^2$. The mechanical connection of the rheostat 194A to the motor 195 is such as to increase and decrease the supply of electric current to the resistor 193A as the radiant energy to which the photoelectric cell 1 or 170 is responsive drops below or rises above a predetermined level.

Subject matter disclosed in this application and not claimed is being claimed in my copending application Serial No. 162,474, filed September 4, 1937. That subject matter consists of subject matter generally like that disclosed in this application, but differs therefrom in that the measuring circuit is not limited specifically to a potentiometric circuit as in this application but instead is more broadly directed to electrical networks.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Photometric measuring apparatus including the combination of a light sensitive device responsive to change in magnitude of a variable condition, a second light sensitive device, an electric lamp arranged to illuminate said second mentioned light sensitive device, means under control of said first mentioned light sensitive device for energizing said lamp so that the illumination of said second light sensitive device is definitely related to that of the first mentioned light sensitive device, a resistor connected in circuit with said lamp and said energizing means, means for opposing the unidirectional potential drop produced across said resistor by the lamp energizing means to a potential drop representative of a previous value of the condition, means for translating the resultant of said opposed potential drops into an alternating voltage whose phase and magnitude are determined by the polarity and magnitude of said resultant unidirectional voltage, said last mentioned means including a pair of electronic valves each having an anode, cathode, and a grid, a connection between said cathodes, a transformer, a connection between each of said anodes and a respective end of one winding of said transformer, an alternating voltage supply source, a connection from one terminal of said alternating voltage supply source to a center tap on said transformer winding and a connection from the other terminal of said alternating supply source to said cathodes, similar resistors connected between each of said grids and said cathodes, means for passing said resultant unbalance current through said resistors, and a reversible electrical motor selectively energized by said alternating voltage adapted to vary the magnitude of said second potential drop to reduce said unbalance voltage.

2. Photometric measuring apparatus comprising the combination with a potentiometric measuring circuit of a light sensitive device responsive to changes in a variable condition for producing a flow of unbalanced electric current in said potentiometric measuring circuit, a device adapted to reduce said unbalanced electric current, electrical valve means for continuously controlling the actuation of said device in accordance with the magnitude of said condition, and operative connections to directly control said electrical valve means by said unbalanced electric current.

3. Photometric measuring apparatus comprising a potentiometric measuring circuit and a light sensitive device responsive to change in magnitude of a variable condition for producing an unbalanced electric current of magnitude corresponding with said change in said potentiometric measuring circuit, an impedance in said circuit adapted to be adjusted to reduce said electric current, a reversible electrical motor adapted to adjust said impedance, electrical valve means for continuously controlling said reversible electrical motor to reduce said unbalanced electric current substantially to zero, and operative connections to directly control said electrical valve means by said unbalanced electric current.

4. Photometric measuring apparatus comprising a potentiometric measuring circuit and a light sensitive device responsive to change in magnitude of a condition for producing an unbalanced electric current in said circuit, a reversible electric motor adapted to reduce said unbalanced electric current, electrical valve means for continuously controlling said reversible electrical motor to reduce said unbalanced electric current substantially to zero, operative connection to directly control said electrical valve means by said unbalanced electric current, a measuring element actuated in accordance with the movements of said motor, and means responsive to the speed of said motor adapted to control its deceleration to ensure reduction of said unbalanced current to zero without overshooting.

5. Photometric measuring apparatus comprising a potentiometric measuring circuit and a light sensitive device responsive to change in magnitude of a variable condition for producing an unbalanced electric current of polarity and magnitude in said circuit corresponding to the direction and extent of said change, an impedance in said circuit adapted to be adjusted to reduce said unbalanced electric current, a reversible electrical motor adapted to adjust said impedance, means including electrical valve means having an input circuit and an output circuit for continuously controlling said reversible electrical motor in accordance with the polarity and magnitude of said unbalanced current and with the rate of reduction of said unbalanced electric current as effected by adjustment of said impedance to reduce said unbalanced current substantially to zero, a connection between said reversible electrical motor and the output circuit of said electrical valve means, and operative connections to directly control the input circuit of said electrical valve means by said unbalanced electric current.

6. Photometric measuring apparatus including the combination of a light sensitive device responsive to change in magnitude of a variable condition, a second light sensitive device, means for illuminating said second light sensitive device so that its illumination is definitely related to that of the first mentioned light sensitive device, means responsive to changes in the energy used by the first mentioned means, said last mentioned means including a potentiometric network in which an unbalanced electric current flow is adapted to be produced upon change in the energy used by said first mentioned means, a device adapted to reduce said unbalanced electric current flow, electrical valve means for continuously controlling the actuation of said device, and operative connections to directly control said electrical valve means by said unbalanced electric current.

7. Photometric measuring apparatus including the combination of a light sensitive device responsive to change in magnitude of a variable condition, a second light sensitive device, means for illuminating said second light sensitive device so that its illumination is substantially the same as that of the first mentioned light sensitive device, means for producing a potential drop representative of the magnitude of the illumination on the second mentioned light sensitive device, means for opposing said potential drop to a second potential drop representative of a previous value of the illumination of said second mentioned light sensitive device to thereby produce an electric current flow when said potential drops are unequal in magnitude, a reversible electrical motor adapted to vary said second mentioned potential drop to equalize said potential drops and thereby reduce said electric current flow substantially to zero, electrical valve means for continuously controlling said reversible electrical motor, and operative connections to directly control said electrical valve means by said electric current.

8. Measuring apparatus including the combination of a Wheatstone bridge the resistance of one arm of which is responsive to change in magnitude of a variable condition thereby unbalancing said bridge, a second arm, means for varying the resistance of said second arm so that its resistance is definitely related to that of the first mentioned arm including energy controlling means responsive to bridge unbalance, said last mentioned means including a potentiometric network in which an unbalanced electric current flow having a polarity and magnitude determined by the sense and extent of change in resistance of said second mentioned arm is adapted to be produced, a device adapted to adjust said potentiometric circuit to reduce said unbalanced electric current flow, electrical valve means for continuously controlling the actuation of said device, and operative connections to directly control said electrical valve means by said unbalanced electric current.

9. Measuring apparatus including the combination of a Wheatstone bridge adapted to be unbalanced in accordance with the change in magnitude of a variable condition, means for measuring said unbalance including means for producing a potential drop across an impedance variable in accordance with bridge unbalance and a self balancing potentiometric network adapted to measure said potential drop and to be unbalanced in accordance with the sense and extent of the change thereof and thereby adapted to have an unbalanced electric current flow produced therein of a polarity and magnitude in accordance with the sense and extent of the change in said potential drop, a device adapted to effect rebalance of said potentiometric network and thereby reduce said unbalanced electric current substantially to zero, electrical valve means for continuously controlling the actuation of said last mentioned device, and operative connections to directly control said electrical valve means by said unbalanced electric current.

10. Measuring apparatus including the combination of a device responsive to change in magnitude of a variable condition, a second device, means for energizing said second device so that its energization is definitely related to the energization of the first mentioned device, means responsive to the energy used by the first mentioned means, said last mentioned means including a potentiometric network adapted to be unbalanced in accordance with the sense and extent of the change of energization of the second mentioned device and thereby adapted to have an unbalanced electric current flow produced therein of a polarity and magnitude in accordance with the sense and extent of the change of energization of the second mentioned device, a device adapted to effect rebalance of said potentiometric network and thereby reduce said unbalanced electric current, electrical valve means for continuously controlling said last mentioned device, and operative connections to directly control said electrical valve means by said unbalanced electric current.

11. Measuring apparatus including the combination of a device adapted to produce an effect responsive to change of magnitude of a variable condition, means for producing an effect variable in accordance with the first mentioned effect and definitely related thereto, means actuated in response to changes in said second effect, said last mentioned means including a potentiometric network adapted to be unbalanced in accordance with the sense and extent of the change in said second effect and thereby adapted to have an unbalanced electric current flow produced therein of a polarity and magnitude in accordance with the sense and extent of the change of actuation of the second mentioned means, a device adapted to effect rebalance of said potentiometric network and thereby reduce said unbalanced electric current, electrical valve means for continuously controlling said last mentioned device, and operative connections to directly control said electrical valve means by said unbalanced electric current.

12. Photometric measuring apparatus including the combination of a light sensitive device responsive to change in magnitude of a variable condition, a second light sensitive device, an electric lamp arranged to illuminate said second light sensitive device, means under control of said first mentioned light sensitive device for energizing said lamp so that the illumination of said second light sensitive device is definitely related to that of the first mentioned light sensitive device, a resistor connected in circuit with said lamp and said energizing means, means for opposing the unidirectional potential drop produced across said resistor by the lamp energizing means to a unidirectional potential drop representative of a previous value of the condition to thereby produce an electric current flow of polarity and magnitude determined by the resultant of said potential drops, a reversible electrical motor adapted to vary said second mentioned potential drop to reduce the resultant potential difference of said potential drops and thereby to reduce said electric current flow, electrical valve means for continuously controlling said reversible electrical motor, and operative connections to directly control said electrical valve means by said electrical current flow.

13. Photometric measuring apparatus including the combination of a light sensitive device responsive to change in magnitude of a variable condition, a second light sensitive device, an electric lamp arranged to illuminate said second mentioned light sensitive device, means under control of said first mentioned light sensitive device for energizing said lamp so that the illumination of said second light sensitive device is definitely related to that of the first mentioned light sensitive device, a resistor connected in circuit with said lamp and said energizing means, means for opposing the unidirectional potential drop produced across said resistor by the lamp energizing means to a potential drop representative of a previous value of the condition to thereby produce an electric current flow in one direction or the other when said potential drops are unequal, means for translating the resultant of said opposed potential drops into an alternating voltage whose phase and magnitude are determined by the polarity and magnitude of said resultant unidirectional voltage, said last mentioned means including a pair of electronic valves each having an anode, cathode, and a grid, means to apply an alternating voltage to the anodes of said valves, and operative connections to directly control the relative conductivities of said valves by said electric current flow, and a reversible electrical motor selectively energized by said alternating voltage to vary the magnitude of said second potential drop to equalize said potential drops.

14. Measuring apparatus including the combination of a Wheatstone bridge circuit adapted to be unbalanced in accordance with change in magnitude of a variable condition, means responsive to bridge circuit unbalance to rebalance said bridge circuit and to produce a potential drop across an impedance variable in accordance with the magnitude of said condition, a self balancing potentiometric network adapted to measure said potential drop and adapted to have unbalanced electric current flows produced therein in accordance with the sense and the extent of the change of said potential drop, a device adapted to effect rebalance of said potentiometric network and thereby reduce said unbalanced electric current flows substantially to zero, electric valve means for continuously controlling the actuation of said device, and operative connections to directly control said electrical valve means by said unbalanced electric current flows.

15. Measuring apparatus comprising a potentiometric measuring circuit and a current producing device responsive to change in magnitude of a variable condition for unbalancing said potentiometric measuring circuit to an extent corresponding with said change, an impedance in said circuit adapted to be adjusted to rebalance said circuit, a reversible electrical motor adapted to adjust said impedance, electrical valve means responsive to said potentiometric unbalance for continuously controlling said motor, said electrical valve means having an output circuit connected to said reversible electrical motor and an input circuit, and a connection of substantially constant impedance connecting said adjustable impedance, said device and the input circuit of said electrical valve means in series.

THOMAS R. HARRISON.